United States Patent [19]

Lew

[11] Patent Number: 4,727,756

[45] Date of Patent: Mar. 1, 1988

[54] VORTEX SHEDDING FLOWMETER WITH LEVER ACTION SIGNAL AMPLIFICATION

[76] Inventor: Hyok S. Lew, 7890 Oak St., Arvada, Colo. 80005

[21] Appl. No.: 922,850

[22] Filed: Oct. 24, 1986

[51] Int. Cl.$^4$ .............................................. G01F 1/32
[52] U.S. Cl. ............................................... 73/861.24
[58] Field of Search ........................ 73/861.22, 861.24

[56] References Cited

U.S. PATENT DOCUMENTS

| | | | |
|---|---|---|---|
| 4,033,189 | 7/1977 | Herzl et al. | 73/861.24 |
| 4,069,708 | 1/1978 | Fussell, Jr. | 73/861.24 |
| 4,181,020 | 1/1980 | Herzl | 73/861.24 |
| 4,307,619 | 12/1981 | Herzl | 73/861.24 |

FOREIGN PATENT DOCUMENTS 823684  11/1959  United Kingdom ............. 73/861.24

Primary Examiner—Herbert Goldstein

[57] ABSTRACT

A vortex shedding flowmeter comprising vortex generator of an elongated cylindrical shape having a cross section of a blunt geometry disposed across a first cross section of a flow passage and a vortex sensor including a wing disposed across a second cross section of the flow passage in a parallel relationship with respect to the vortex generator, wherein the wing vortex sensor is secured to the wall of the flow passage at one extremity, while the other extremity is connected to one extremity of a lever that transmits the flexing movement of the wing vortex sensor to a transducer disposed at the other extremity of the lever. The vortex shedding frequency detected by the combination of the wing vortex sensor-lever amplifier-transducer provides the information on the fluid velocity through the flow passage as the vortex shedding frequency is proportional to the fluid velocity.

20 Claims, 9 Drawing Figures

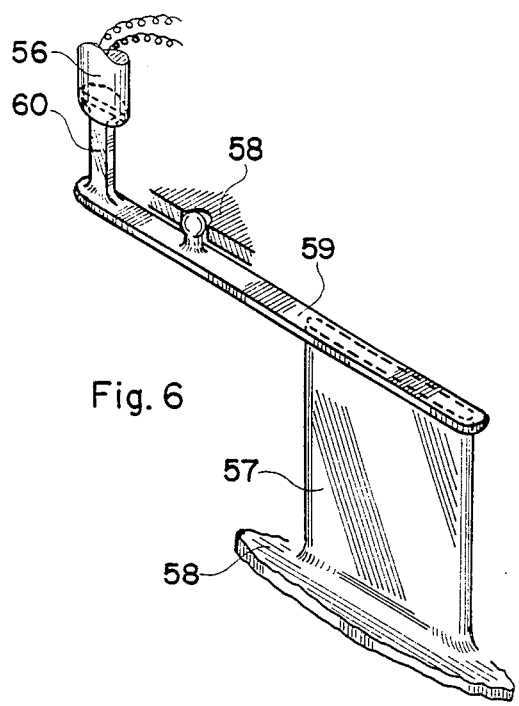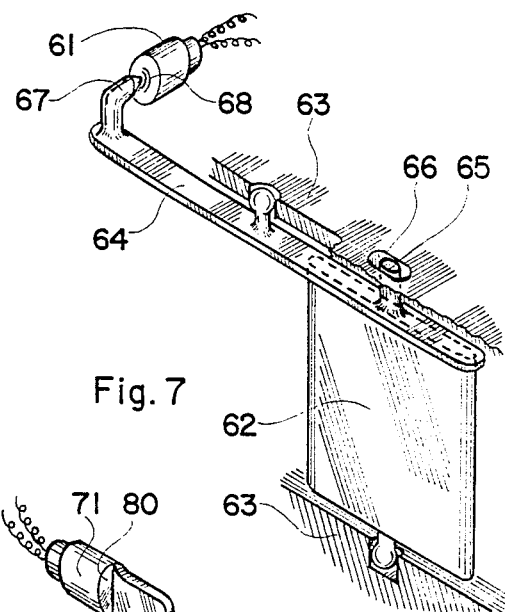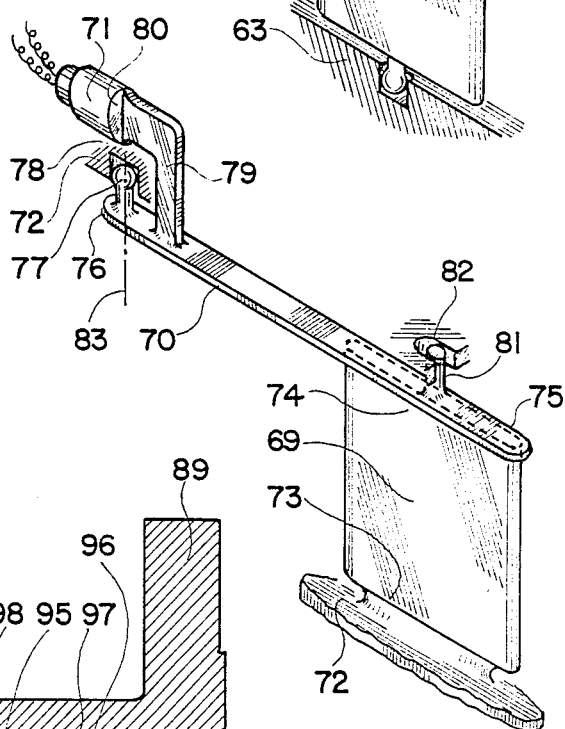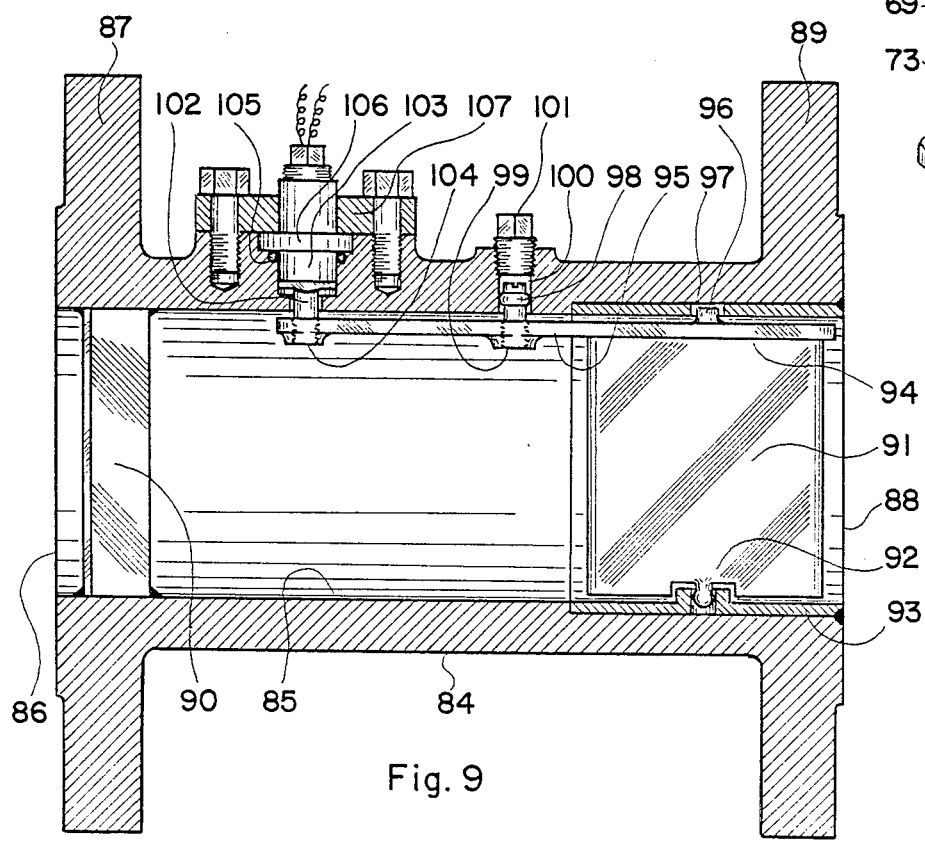

VORTEX SHEDDING FLOWMETER WITH LEVER ACTION SIGNAL AMPLIFICATION

BACKGROUND OF THE INVENTION

This patent application is copending with application Ser. No. 920,977 entitled "Tandem Wing Universal Vortex Shedding Flowmeter" filed on Oct. 18, 1986.

Experimental studies on the fluid flow around a bluff body have proven the fact that the bluff body sheds a series of vortices from the two opposite cylindrical sides thereof in an alternating pattern at frequencies proportional to the fluid velocity at Reynolds number as low as a few hundred and as high as a few million. It has been proven that the vortex shedding frequency is directly proportional to the fluid velocity in a range of Reynolds number greater than 1,000 and less than 100,000. Consequently, a perfect vortex shedding flowmeter should operate in the aforementioned range with hundred to one turn-down ratio. For example, a perfect vortex shedding flowmeter should measure the air flow velocity as low as 5 feet per second and as high as 500 feet per second under the standard condition and water flow velocity as low as 0.4 feet per second to 40 feet per second. With few exceptions, the existing vortex shedding flowmeters available in the present day commercial market operate in a much reduced range with twenty to one turn-down ratio, wherein these existing vortex shedding flowmeters are unable to measure air velocities less than 15-20 feet per second and water velocities less than 1-2 feet per second.

SUMMARY OF THE INVENTION

The primary object of the present invention is to provide a vortex shedding flowmeter capable of operating in a range with 100 to 1 turn-down ratio.

Another object is to provide a vortex shedding flowmeter capable of measuring air velocities as low as 5 feet per second and water velocities as low as 0.4 feet per second.

A further object is to provide a vortex shedding flowmeter comprising a wing vortex sensor with one extremity secured to the wall of the flow passage and the other extremity connected to one extremity of the transmitter lever that includes a transducer at the other extremity thereof, wherein the transmitter lever is supported intermediate the two extremities thereof.

Yet another object is to provide a vortex shedding flowmeter including the wing vortex sensor-transmitter lever-transducer combination, wherein the transducer comprises a pair of piezoelectric elements disposed on a plane substantially perpendicular to the length of the bluff body and that of the wing in a mirror image to one another about a plane simultaneously including the central axis of the flow passage and chord plane of the wing vortex sensor.

Yet a further object is to provide a vortex shedding flowmeter including the wing vortex sensor-transmitter lever-transducer combination wherein the transducer comprises a position sensing means that detects the change in the position of the other extremity of the transmitter lever.

Still another object is to provide a vortex shedding flowmeter including the wing vortex sensor-transmitter lever-transducer combination wherein the transducer comprises a velocity sensing means that detects the velocity of the other extremity of the transmitter lever.

Still a further object is to provide a vortex shedding flowmeter including the wing vortex sensor-transmitter lever-transducer combination wherein the transducer comprises a torque sensing means that detects the torque on the transmitter lever about the supporting point thereof. Additionally another object is to provide a vortex shedding flowmeter including the wing vortex sensor-transmitter lever-transducer combination wherein the transmitter lever mechanically amplifies the vortex signals sensed by the wing vortex sensor in transmitting the vortex signal from the wing vortex sensor to the transducer.

Additionally a further object is to provide a vortex shedding flowmeter including the wing vortex sensor-transmitter lever-transducer combination wherein the mechanical combination of the wing vortex sensor and the transmitter lever has no resonance frequency or high resonance frequency located outside of the operating range or resonance frequency of suppressed resonance amplitude much smaller than the amplitude of the vortex signals at that resonance frequency. These and other objects of the present invention will become clear as the description thereof proceeds.

BRIEF DESCRIPTION OF THE FIGURES

The present invention may be described with a great clarity and specificity by referring to the following figures:

FIG. 6 illustrates yet another embodiment of the vortex detector comprising the wing vortex sensor-transmitter lever-transducer combination wherein the transducer comprises a stress sensing means.

FIG. 7 illustrates yet a further embodiment of the vortex detector comprising the wing vortex sensor-transmitter lever-transducer combination.

FIG. 8 illustrates still another embodiment of the vortex detector comprising the wing vortex sensor-transmitter lever-transducer combination.

FIG. 9 illustrates a cross section of an embodiment of the vortex shedding flowmeter constructed in accordance with the principles of the present invention.

DESCRIPTION OF THE ILLUSTRATED EMBODIMENTS

Figure 1:
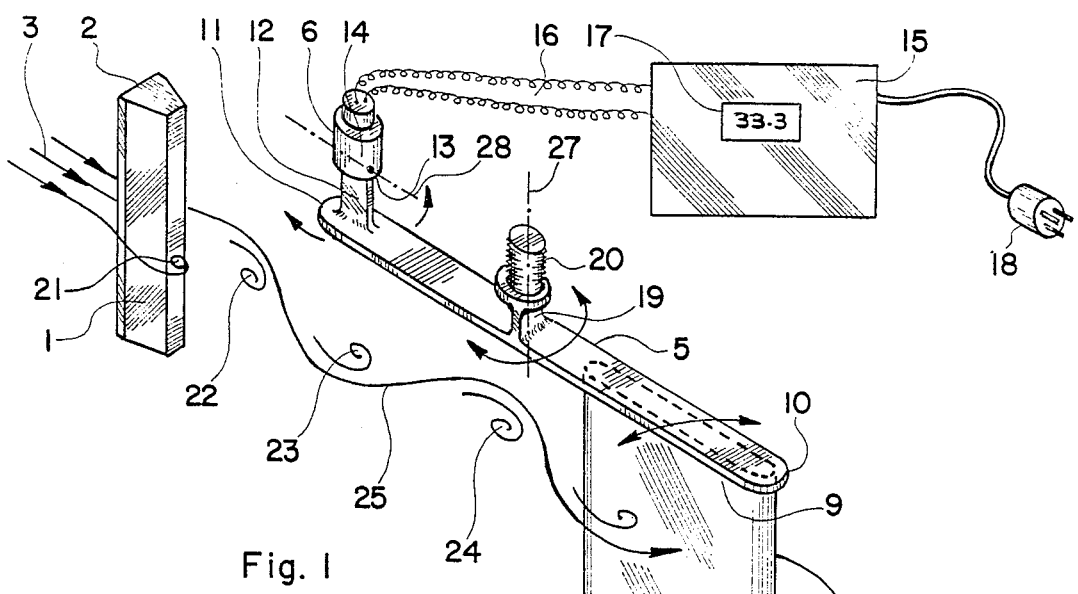
FIG. 1 illustrates a perspective view of an embodiment of the present invention including a vortex generator comprising a bluff body and a vortex detector comprising the wing vortex sensor-transmitter lever-transducer combination.

In FIG. 1 there is illustrated a perspective view of an embodiment schematically describing the construction and operation of a vortex shedding flowmeter constructed in accordance with the principles of the present invention. The vortex shedding flowmeter includes a vortex generator 1 comprising a bluff body of elongated cylindrical shape having a blunt cylindrical side surface 2 facing the fluid flow 3 at a substantially perpendicular angle, and a vortex detector comprising the wing vortex sensor 4, the transmitter lever 5 and the transducer assembly 6. The wing vortex sensor 4 is disposed transverse to the flow direction substantially parallel to the bluff body 1 wherein the chord plane of the wing vortex sensor 4 is substantially parallel to the direction of the flow. One extremity 7 of the wing vortex sensor 4 is secured to the wall of the flow passage in a fixed or semi-fixed relationship by means of threaded connection 8 as shown in this particular embodiment or by other connection means such as welding, clamping, etc. For the sake of brevity in the illustration, the wall of the flow passage to which the one extremity 7 of the wing vortex sensor 4 is secured, is not shown in FIG. 1. The other extremity 9 of the wing vortex sensor 4 is connected to one extremity 10 of the transmitter lever 5. The other extremity 11 of the transmitter lever 5 includes a flat bar 12 extending therefrom, that is disposed on a plane including the lengthwise axis of the transmitter lever 5 and the lengthwise axis of the wing vortex sensor 4. The flat bar 12 is connected to the closed end 13 of the vessel 14 housing the transducer means contained in the transducer assembly 6. The transmitter elements contained in the vessel 14 is connected to a data processor 15 by a plurality of electrical wires 16. The data processor 15 includes data display means 17 and data output means 18 that feed the flow data extracted from the signals from the transducer element to other flow controllers or data processors. The transmitter lever 5 is supported by a flat torsion bar 19 that is anchored to the wall of the flow passage by the threaded connection means 20 as shown or by other connection means. The wall of the flow passage is not shown in FIG. 1. The torsion bar support 19 is on a plane perpendicular to the lengthwise axis of the transmitter lever 5 whereby the transmitter lever 5 is restrained from the lateral shifting movements while it is allowed to pivot over small angles about the center-line of the torsion spring bar 19.

The arrangement shown in FIG. 1 operates on the following principles in measuring the fluid velocity: The vortex generator comprising the bluff body 1 produces a series of vortices 21, 22, 23, 24, etc., which vortices are shed from two opposite sides of the bluff body 1 in an alternating pattern. The vortices shed from two opposite sides of the bluff body rotate in two opposite directions. The interaction between the vortices and the fluid stream produces sinuating streamlines 25, which have the wave length λ equal to $$\lambda = \frac{2U}{f},$$

where U is the fluid velocity and f is the vortex shedding frequency. The wing vortex sensor 4 immersed in the middle of sinuating streamlines experiences alternating lift forces with maximum amplitude proportional to $\rho^2$ and frequency equal to f, where $\rho$ is the density of the fluid. In the range of Reynolds number Re greater than 1,000 and less than 100,000, where Reynolds number is defined by the equation Re = Ub/ν where b is the width of the bluff body and ν is the kinematic viscosity of the fluid, the vortex shedding frequency is linearly related to the fluid velocity by the equation $$f = \frac{S_t U}{b},$$

$S_t$ is a dimensionless constant known as Strouhal number that is a constant in the range of Reynolds number greater than 1,000 and less that 100,000. The numerical value of $S_t$ is in the range of 2 to 2.5. The exact value of which depends on the specific arrangement of the bluff body in conjunction with the boundary of the fluid flow such as the geometry and dimension of the flow passage as well as the velocity profile of the fluid flow. Once the numerical value of $S_t$ divided by the bluff body width 6 is determined empirically, the fluid velocity U is determined from the vortex shedding frequency f by the aforementioned equation. In the present invention, the vortex shedding frequency is determined by measuring the frequency of the alternating lift forces experienced by the wing vortex sensor 4. The alternating lift forces on the wing 4 create oscillatory pivoting movements of small amplitude of the wing 4 about the first pivoting axis 26 located adjacent to the one extremity 7 of the wing 4 secured to the wall of the flow passage and movement disposed parallel to the direction of the fluid flow, which oscillatory pivoting tube of the wing 4, in turn, create pivoting movements of small amplitude of the transmitter lever 5 about the second pivoting axis 27 located intermediate the two extremities of the transmitter lever 5 and disposed parallel to the lengthwise axis of the wing 4. The aforementioned oscillatory pivoting movements of the transmitter lever of small magnitude in deflection angles produce oscillatory angular deflections of the flat adapter bar 12 about the third pivoting axis 28 that intersects the central axis of the transducer assembly 6 and disposed parallel to the lengthwise axis of the transmitter lever 5. The vortex detector comprising the wing 4, transmitter lever 5 and the transducer assembly 6 converts the alternating lift force experienced by the wing 4 to electric signals which are fed to the data processor 15 through the electric cables 16. The data processor 15 displays the vortex frequency or other data computed from the vortex frequency by the display means 17 or transmits those data to the other devices by the output means 18. The transducer assembly 6 included in the vortex detector comprising the wing 4-transmitter lever 5 - transducer combination may include a torque or force sensing device or a position or velocity sensing device. By selecting an appropriate ratio of the first distance between the wing 4 and the supporting point 20 of the transmitter lever 5 to the second distance between the supporting point 20 and the transducer assembly 16, the vortex signals sensed by the wing 4 can be transmitted to the transducer assembly 6 at an amplified level in the form of strain or stress. For example, if the transducer assembly 6 comprises a torque or stress sensing means, the magnitude of the torque or stress transmitted to the transducer can be amplified by selecting the aforementioned first distance larger than the second distance. On the other hand, when the transducer assembly 6 comprises a position or velocity sensing means, the displacement or velocity of the extremity 11 of the transmitter lever 5 can be amplified by selecting the aforementioned first distance smaller than the second distance. In the particular embodiment illustrated in FIG. 1, the transducer assembly 6 includes a torque sensing means that senses torque about the third pivoting axis 28. It should be understood that, in the particular embodiment shown in FIG. 1, the combined stiffness of the vortex detector constituted by the fixedly secured wing 4 at one extremity 7 and by the torsion spring 19 supporting the transmitter lever 5 must be high enough compared with the total inertia of the vortex sensor, whereby the resonance frequency of the vortex detector is sufficiently high and out of the range of operation of the flowmeter. It should be mentioned that the arrangement shown in FIG. 1 may be employed to construct a "three-in-one" meter that measures the fluid velocity U, fluid density $\rho$ and the mass flow $\rho U$, simultaneously. As explained by the description of the operating principles of the vortex shedding flowmeter, the fluid velocity U is determined by detecting the vortex shedding frequency f. The amplitude of the alternating lift force on the wing 4 exerted by the sinuous streamlines is proportional to $\rho U^2$ and, consequently, the amplitude of the signals generated by the transducer is proportional to $\rho^2$ By combining the data on the frequency, and amplitude of the signals transmitted from the transducer, the processor can compute numerical of U, $\rho U$ and $\rho$ on real-time basis.

Figure 2:
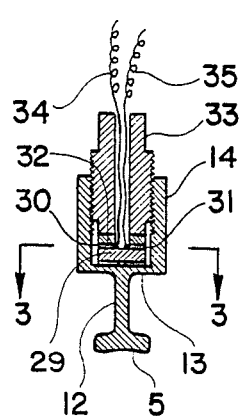
FIG. 2 illustrates a cross section of an embodiment of the transducer assembly detecting the stresses created by the vortices exterting alternating lift forces on the wing vortex sensor.
Figure 3:
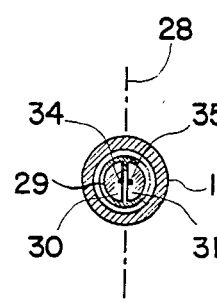
FIG. 3 illustrates another cross section of the transducer assembly shown in FIG. 2.

In FIG. 2 there is illustrated a cross section of an embodiment of the transducer assembly 6 included in the embodiment shown in FIG. 1, which cross section is taken along a plane simultaneously including the central axis of the transducer assembly 6 and the lengthwise axis of the transmitter lever 5. The flat adapter bar 12 disposed on a plane parallel to the lengthwise axis of the transmitter lever 5 extends from a thin or diaphragmatic flange 13 and is connected to the other extremity of the transmitter lever 5 opposite to one extremity connected to the wing vortex sensor. The thin flange 13 constitutes the closed end of the cylindrical vessel 14 housing the piezoelectric transducer assembly 29 comprising a pair of piezoelectric elements 30 and 31, which are disposed on a plane parallel to the flange 13 under a pressurized contact with the flange 13 in a mirror image to one another about a plane including the flat adapter bar 12. The conducting wires 34 and 35 respectively connected to the two piezoelectric elements 30 and 31 included in the cable 16 are routed through an axial hole included in the threaded plug 33 plugging up the open end of the vessel 14, which plug exerts pressure on the two piezoelectric elements 30 and 31 that maintains the pressurized contact with the flange 13. An electrically insulating annular disc 32 separates the two piezoelectric elements 30 and 31 from the threaded plug 33. It should be understood that the face of the piezoelectric assembly 29 opposite to the two of the piezoelectric electrodes elements 30 and 31 is grounded to the flange 13, while the two piezoelectric elements 30 and 31 are insulated from the vessel 14. In FIG. 3 there is illustrated another cross section of the transducer assembly shown in FIG. 2, which cross section is taken along plane 3—3 as shown in FIG. 2. The piezoelectric assembly comprises a pair of electrodes 30 and 31 affixed to the face of the piezoelectric crystal 29 of a disc shape, which crystal may be divided into two halves or of a single circular disc. The two piezoelectric elements comprising the two electrodes 30 and 31 are disposed in a mirror image to one another about a plane including the third pivoting axis 28, that substantially coincides with the line joint between the flat bar 12 and the flange 13 as shown in FIG. 1.

In the particular embodiment of the piezoelectric transducer illustrated in FIGS. 2 and 3, the two piezoelectric elements are polarized in the same direction. The oscillatory pivoting movements of small magnitude of the flat bar 12 about the third pivoting axis 28 exerts a tensile loading to one piezoelectric element and a compressive loading to the other piezoelectric element in an alternating mode. The two piezoelectric elements experiencing alternating loading of opposite sign generate alternating electromotive forces therebetween, which are amplified and processed by the electronic processor 15. The piezoelectric transducer of construction shown in FIGS. 2 and 3 does not pick up any noises associated with the pipeline vibration for it is designed to pick up signals associated with torques only that are transmitted through the flat bar 12.

Figure 4:
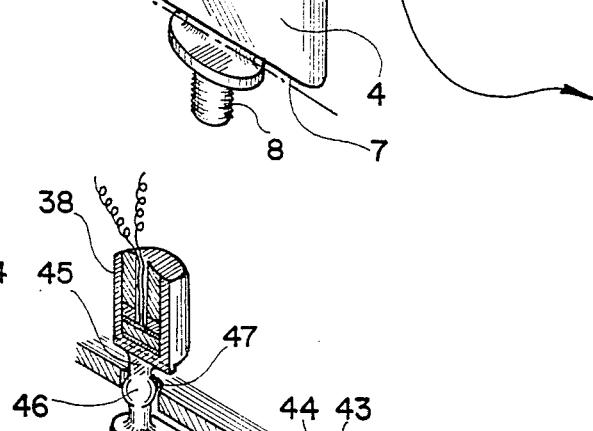
FIG. 4 illustrates another embodiment of the vortex detector comprising the wing vortex sensor-transmitter lever-transducer combination.

In FIG. 4 there is illustrated a perspective view of another embodiment of the vortex detector comprising the wing vortex sensor 36—transmitter lever 37—transducer assembly 38, which are arranged in an assembly similar to the arrangement shown in FIG. 1. Of course, the vortex detector shown in FIG. 4 is for use in conjunction with a vortex generator as illustrated in FIG. 1. There are four differences between the vortex detectors respectively shown in FIGS. 1 and 4. Firstly, one extremity 39 of the wing 36 is secured to the wall 40 of the flow passage in a swiveling relationship by means of a ball joint 41 extending from the extremity 39 of the wing 36 that engages a blind hole 42 included in the wall 40 of the flow passage in a close tolerance. Secondly, the transmitter lever 37 is supported at the middle in a swiveling relationship by a ball joint 43 extending laterally from the transmitter bar that engages a hole 44 included in the wall 40 of the flow passage in a close tolerance. Thirdly, the flat adapter bar extending from the flange in contact with the piezoelectric transducer assembly and connected to the transmitter lever 37 includes a ball-shaped midsection 46 that engages a clearance hole 47 disposed through the wall 40 of the flow passage, which arrangement limits the magnitude of the oscillatory pivoting movements of the flat adaptor bar 45 to a value allowed by the clearance between the ball-shaped midsection 46 and the clearance hole 47. Fourthly, the pivoting movement of the wing 36 is limited to a pre-set maximum value as the wing motion limiter 48 extending from the other extremity 49 of the wing 36 engages a clearance hole 50 included in the wall 40 of the flow passage. In the arrangement shown in FIG. 4, the vortex detector comprising the wing-transmitter lever-transducer combination has a low stiffness associated with the flat adaptor bar 45 and, consequently, the resonance frequency of the vortex detector can be within the operating range. The motion limiters 46 and 48 checks the amplitude of the resonance to an acceptably small value enabling the electronic processor to distinguish the vortex signals from the resonance. It is clear that only one of the two motion limiters 46 and 48 may be employed. It is also clear that one or both of the motion limiters shown in FIG. 4 may be incorporated into the arrangement shown in FIG. 1.

Figure 5:
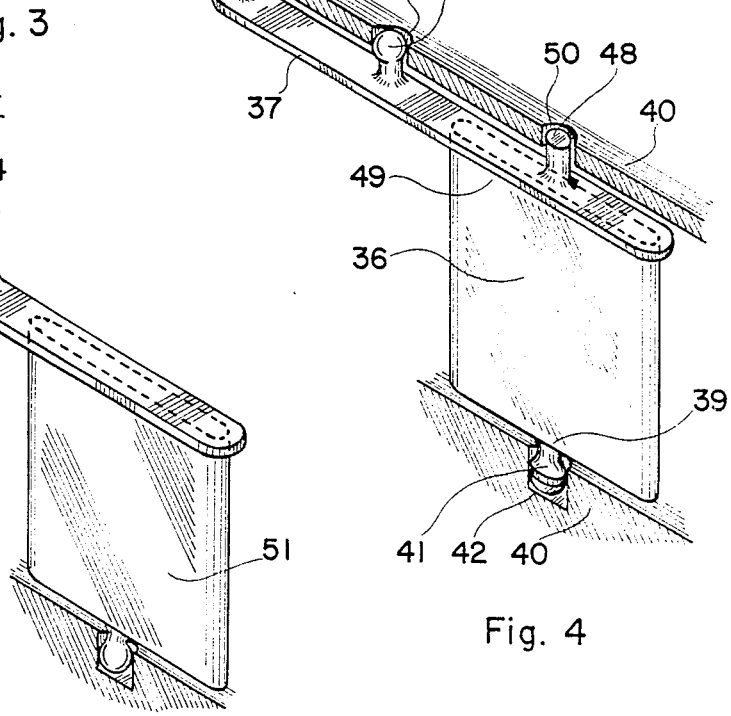
FIG. 5 illustrates a further embodiment of the vortex detector comprising the wing vortex sensor-transmitter lever-transducer combination wherein the transducer comprises a position or velocity sensing means for detecting the movements of the other extremity of the transmitter lever opposite to one extremity thereof connected to the wing vortex sensor.

In FIG. 5 there is illustrated a further embodiment of the vortex detector comprising the wing 51, transmitter lever 52 and transducer assembly 53. The wing 51 is secured to the wall of the flow passage in a swiveling relationship as described in conjunction with FIG. 4. The transmitter lever 52 is supported at the middle by a torsional spring support affixed to the wall of the flow passage as described in conjunction with FIG. 1. The transducer assembly 53 includes a position or velocity sensing means such as a magnetic sensor that detects the gap or the time rate of change of the gap between the sensor head 54 and a pointed target 55 affixed to the other extremity of the transmitter lever opposite to one extremity connected to the wing 51. It should be understood that the wing 51 may be secured to the wall of the flow passage in a fixed or semi-fixed relationship as shown in FIG. 1 instead of the particular swiveling relationship and that the transmitter lever 52 may be supported at the middle by a swivel joint as shown in FIG. 4 instead of the particular swivel joint. It should be also understood that the motion limiter described in conjunction with FIG. 4 may be incorporated into the arrangement shown in FIG. 5.

In FIG. 6 there is illustrated yet another embodiment of the vortex detector representing an optimized design employing a torque sensing transducer 56 having the embodiment shown in FIGS. 2 and 3. The wing 57 is secured to the wall 58 of the flow passage at one extremity in a fixed or semi-fixed relationship. The transmitter lever 59 is supported by a swivel joint secured to the wall 58 of the flow passage at a short distance away from the extremity of the transmitter lever 59, which extremity is connected to the torque sensing transducer 56 by a flat adapter bar 60 of a sizable length. In this particular embodiment, the torque transmitted from the wing 57 to the transducer 56 is amplified twice; firstly by the mechanical advantage provided by the lever action of the transmitter lever 59 and, secondly, by that of the long adapter bar 60. The motion limiter such as the combination including elements 48 and 50 shown in FIG. 4 may be incorporated into the arrangement shown in FIG. 6. In this particular embodiment, the cantilever wing 57 with one fixed end should provide sufficient stiffness to keep the resonance frequency of the vortex detector assembly well above the operating range of the flowmeter.

In FIG. 7 there is illustrated yet a further embodiment of the vortex detector that is optimized in design in conjunction with the use of a position or velocity sensing transducer 61 that operates on principles described in conjunction with FIG. 5. The one extremity of the wing 62 is secured to the wall 63 of the flow passage, while the movement of the other extremity connected to the transmitter lever 64 is limited to a pre-set maximum amplitude by a motion limiter 65 engaging a clearance hole 66 included in the wall 63 of the flow passage. The transmitter lever 64 is supported by a swivel joint secured to the wall 63 of the flow passage at a short distance from one extremity thereof connected to the wing 62. The other extremity of the transmitter lever 64 oposite to one extremity connected to the wing 62 includes a pointed target 67 rigidly affixed thereto. The position or velocity sensing transducer 61 detects the gap distance or time rate of change thereof between the pointed tip of the target 67 and the head 68 of the transducer. The amplitude of the pivoting movements of the target 67 is amplified by the lever action of the transmitter lever 64. The particular embodiment of the vortex detector shown in FIG. 7 has zero mechanical stiffness and, consequently, it has zero resonance frequency Consequently, the resonance frequency of the vortex detector shown in FIG. 7 is below the operating range of the flowmeter.

In FIG. 8 there is illustrated still another embodiment of the vortex detector comprising the wing 69, the transmitter lever 70 and the transducer assembly 71 including a torque sensing means. The wing 69 is secured to the wall 72 of the flow passage at one extremity 73 in a fixed or semi-fixed relationship, while the other extremity 74 is connected to one extremity 75 of the transmitter lever 70, which is secured to the wall 72 of the flow passage at the other extremity 76 in a swiveling relationship by means of a ball joint 77 extending from the other extremity 76 of the transmitter lever 70 and engaging a hole 78 included in the wall 72 of the flow passage in a close tolerance. An angled flat adapter bar 79 extending from the thin or diaphragmatic flange 80 is connected to the transmitter lever 70 intermediate the two extremities thereof and adjacent to the other extremity thereof pivotably secured to the wall of the flow passage. The one extremity 75 of the transmitter lever 70 may include a motion limiting device such as a post 81 extending therefrom and engaging a clearance slot 82 included in the wall of the flow passage. The transducer assembly 71 has essentially the same construction as the piezoelectric transducer shown in FIGS. 2 and 3. In this particular embodiment, the line of intersection between the flange 80 and the angled flat adaptor bar 79 substantially coincides with the pivoting axis 83 defined by the swivel joint disposed at the extremity 76 of the transmitter lever 70. The pair of piezoelectric elements included in the transducer assembly 71 as shown in FIGS. 2 and 3 are disposed on a plane parallel to the flange 80 in a mirror image to one another about a plane simultaneously including the pivoting axis 83 and the flat angled coupling bar 79. The torque about the pivoting axis 83 created by the alternating lift forces on the wing vortex sensor 69 is amplififed by the lever action of the transmitter lever 70. It is clear that the combination of the transducer assembl including elements 79 and 80 can be replaced with the combination of elements 56 and 60 as shown in FIG. 6. The motion limiting means comprising elements 81 and 82 may be omitted. The fixed support of the wing 69 at the extremity 73 thereof may be substituted with a swiveling support as shown in FIG. 7.

In FIG. 9 there is illustrated a cross section of a vortex shedding flowmeter that employs the construction design and operating principles of the present invention, which are illustrated in conjunction with FIGS. 1 through 8. the flowmeter body 84 includes a flow passage 85 extending from one extremity 86 with a first coupling means such as a flange 87 to the other extremity 88 including a second coupling means such as another flange 89. The vortex generator or bluff body 90 is disposed across a first cross section of the flow passage 85 adjacent to the one extremity 86 of the flowmeter body. The two extremities of bluff body 90 are rigidly affixed to the wall of the flow passage 85 by weld connection as shown or by other mechanical connection means. The wing vortex sensor 91 is disposed across another cross section of the flow passage adjacent to the other extremity 88 of the flowmeter body in substantially parallel relationship with respect ot the bluff body 90. The one extremity 92 of the wing 91 is secured to an insertion sleeve 93 fitted into a counter bore included in the flowmeter body in a coaxial relationship with respect to the flow passage, which securement may be a swiveling type as shown, or a fixed or semi-fixed type as shown in FIG. 6 or 8. The other extremity 94 of the wing 91 connected to the one extremity of the transmitter lever 95 may include a motion limiting device including a post 96 engaging a clearance hole 97 disposed through the wall of the insertion sleeve 93. The pivoting or swiveling support 98 is secured to the transmitter lever 95 by a threaded connection means 99. The ball joint of the swiveling support 98 is confined in a hole 100 disposed through the wall of the flow passage that is plugged up with a pipeplug 101. The adapter bar 102 extending from the flange of the transducer housing 103 is connected to the other extremity of the transmitter lever 95 by a threaded connection means 104. The transducer housing 103 is placed in a counter bored hole disposed through the wall of the flow passage, wherein it is secured in an affixed and leak-proof manner by means of the combination including an annular seal 105, a retainer flange 106 included in the transducer housing 103 and a retainer ring 107 secured to the flowmeter body by the plurality of screws. Of course, the transducer housing 103 can be weld connected directly to the flowmeter body. The vortex detector of other construction such as those shown in FIGS. 1, 4–8 which are different from the particular embodiment shown in FIG. 9 can be readily incorporated into the construction of a vortex shedding flowmeter by using a design parallel to that illustrated in FIG. 9. The type of design of the vortex shedding flowmeter shown in FIG. 9 provides one particularly important advantage. The sinuating streamlines produce the alternating lift forces with the maximum amplitude when the wing vortex sensor is disposed at a downstream position separated from the bluff body by a distance equal to 1.5 to 2 time of the diameter of the flow passage. By placing the bluff body and the wing vortex sensor adjacent to the two extremities of the flow passage as shown in FIG. 9, the over-all length of the flowmeter body can be minimized without compromising on the required distance of separation between the bluff body and the wing vortex sensor.

While the principles of the present invention have now been made clear by the illustrative embodiments, it will be immediately obvious to those skilled in the art, many modifications of the structures, arrangements, elements, proportions and materials which are particularly adapted to the specific working environments and operating conditions in the practice of the invention without departing from those principles.

The embodiments of the invention in which an exclusive property or privilege is claimed are defined as follows:

1. A flowmeter for measuring fluid flow comprising in combination:
   (a) a flowmeter body including a flowpassage extending from one extremity to the other extremity of said flowmeter body;
   (b) a vortex generator of an elongated cylindrical shape with a blunt cylindrical side surface disposed across a first cross section of the flow passage, wherein said blunt cylindrical side surface is disposed substantially perpendicular to the central axis of the flow passage in
   (c) a wing disposed across a second cross section of the flow passage; in a substantially parallel relationship with respect to said vortex generator wherein one extremity of said wing is secured to the wall of said flow passsage;
   (d) a transmitter lever disposed substantially parallel to the central axis of the flow passage with one extremity connected to the other extremity of said wing opposite to said one extremity secured to the wall of the flow passage, wherein the other extremity of said transmitter lever opposite to said one extremity connected to the wing is secured to the wall of the flow passage in a pivotable relationship about a pivoting axis parallel to the lengthwise axis of the wing; and
   (e) a transducer means under a pressurized contact with a flange, wherein said flange is connected to said transmitter lever at a point adjacent to said pivoting axis by an adapter member including a flat section disposed on a first plane including said pivoting axis and perpendicular to said flange;
wherein said transducer means provides signals related to frequencies of the vortex shedding from said vortex generator as a measure of fluid flow through the flow passage.

2. The combination as set forth in claim 1 wherein said combination includes a data processor that converts signals from said transducer means to data directly related to the fluid flow through said flow passage.

3. The combination as set forth in claim 1 wherein the securement of said one extremity of the wing to the wall of the flow passage is a fixed arrangement.

4. The combination as set forth in claim 1 wherein the securement of said one extremity of the wing to the wall of the flow passage is a pivotable arrangement.

5. The combination as set forth in claim 1 wherein said combination includes means for limiting pivoting movements of said transmitter lever about said pivoting axis to a small magnitude.

6. The combination as set forth in claim 1 wherein said flange is disposed on a second plane parallel to the lengthwise axis of said transmitter lever and perpendicular to said first plane.

7. The combination as set forth in claim 6 wherein said transducer means comprises two piezoelectric elements disposed on a plane parallel to said second plane in a mirror image to one another about said first plane.

8. The combination as set forth in claim 1 wherein said flange is disposed on a second plane including said pivoting axis and perpendicular to said first plane.

9. The combination as set forth in claim 8 wherein said transducer means comprises two piezoelectric elements disposed on a plane parallel to said second plane in a mirror image to one another about said first plane.

10. A flowmeter for measuring fluid flow comprising in combination:
   (a) a flowmeter body including a flow passage extending from one extremity to the other extremity of said flowmeter body;
   (b) a vortex generator of an elongated cylindrical shape with a blunt upstream surface disposed across a first cross section of the flow passage, wherein said blunt surface is disposed generally perpendicular to the central axis of the flow passage;
   (c) a wing disposed across a second cross section of the flow passage in a generally parallel arrangement with respect to said vortex generator, wherein one extremity of said wing is secured to the wall of the flow passage;
   (d) a lever member disposed generally parallel to the central axis of the flow passage, wherein one extremity of said lever member is connected to the other extremity the wall of the flow passage and the other extremity of said lever member is secured to the wall of the flow passage; and
   (e) a transducer means under is pressurized contact with a flange including an elongated extension, wherein an extremity of said elongated extension is connected to said lever member at a section intermediate the two extremities of said lever member; wherein said transducer means provides signals related ot the frequencies of vortex shedding from said vortex generator in an amplified manner as a measure of fluid flow through the flow passage.

11. The combination as set forth in claim 10 wherein said combination includes a data processor that converts signals from said transducer means to data directly related to the fluid flow through the flow passage.

12. The combination as set forth in claim 10 wherein said one extremity of the wing is secured to the wall of the flow passage in a fixed arrangement.

13. The combination as set forth in claim 10 wherein said one extremity of the wing is secured to the wall of the flow passage in a pivotable arrangement.

14. The combination as set forth in claim 10 wherein said the other extremity of said lever member is pivotably secured to the wall of the flow passage.

15. The combination as set forth in claim 10 wherein said combination includes means for limiting lateral deflections of said the other extremity of the wing.

16. A flowmeter for measuring fluid flow comprising in combination:
  (a) a flowmeter body including a flow passage extending from one extremity to the other extremity of said flowmeter body;
  (b) a vortex generator of an elongated cylindrical shape with a blunt upstream surface disposed across a first cross section of the flow passage, wherein said blunt surface is disposed generally perpendicular to the central axis of the flow passage;
  (c) a wing disposed across a second cross section of the flow passage in a generally parallel arrangement with respect to said vortex generator, wherein one extremity of said wing is secured to the wall of the flow passage;
  (d) a lever member disposed generally parallel to the central axis of the flow passage, wherein one extremity of said lever member is connected to the other extremity of said wing opposite to said one extremity secured to the wall of the flow passage and said lever is pivotably secured to the wall of the flow passage at a section intermediate the two extremities of said lever member; and
  (e) a transducer means under a pressurized contact with a flange including an elongated extension, wherein an extremity of said elongated extension is connected to the other extremity of said lever member opposite to said one extremity of the lever member; wherein said transducer means provides signals related to the frequencies of vortex shedding from said vortex generator in an amplified manner as a measure of fluid flow through the flow passage.

17. The combination as set forth in claim 16 wherein said combination includes a data processor that converts signals from said transducer means to data directly related to the fluid flow through the flow passsage.

18. The combination as set forth in claim 16 wherein said one extremity of the wing is secured to the wall of the flow passage in a fixed arrangement.

19. The combination as set forth in claim 16 wherein said one extremity of the wing is secured to the wall of the flow passage in a pivotable arrangement.

20. The combination as set forth in claim 16 wherein said combination includes means for limiting lateral deflections of said the other extremity of the wing.

* * * * *